E. WITZBERGER.
SPRING STOVE BOLT.
APPLICATION FILED NOV. 15, 1921.

1,426,239.

Patented Aug. 15, 1922.

Edmund Witzberger
INVENTOR
BY Victor J. Evans
ATTORNEY

WITNESS:

UNITED STATES PATENT OFFICE.

ETIENNE WITZBERGER, OF CARNEGIE, PENNSYLVANIA, ASSIGNOR TO WITZBERGER HEATING APPLIANCES COMPANY, A CORPORATION OF PENNSYLVANIA.

SPRING STOVE BOLT.

1,426,239. Specification of Letters Patent. Patented Aug. 15, 1922.

Application filed November 15, 1921. Serial No. 515,396.

*To all whom it may concern:*

Be it known that I, ETIENNE WITZBERGER, a citizen of the United States, residing at Carnegie, in the county of Allegheny and State of Pennsylvania, have invented new and useful Improvements in Spring Stove Bolts, of which the following is a specification.

This invention relates to securing means, and more particularly to what I term a spring stove bolt.

One of the main objects of the invention is to provide a bolt or securing device of simple construction and operation which is adapted to be readily inserted through alined openings in plates in a stove structure, and to effectually clamp or secure the plates together. A further object is to provide a device of this character which may be readily produced at small cost. Further objects will appear from the detailed description.

In the drawings:—

Figure 1:
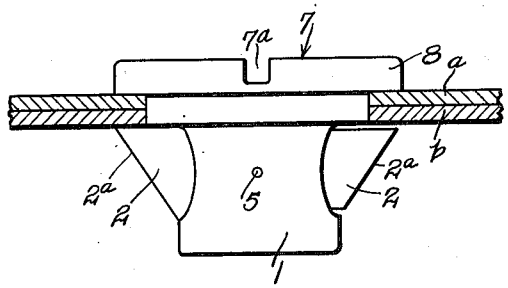
Figure 1 is a side view of the device as applied.

The device includes a cylindrical body 1 which is provided with a diametrical bore in which is mounted two telescoping securing members 2 of cylindrical cross-section, these members being forced apart by an expansion coil spring 3 confined between tabs 4 turned up at the outer ends of members 2. Outward movement of members 2 is positively limited by a pin 5 secured through body 1 and extending through slots 6 in members 2. The outer end of each member 2 is beveled at $2^a$ so that when body 1 is forced through alined openings in overlapping plates $a$ and $b$ members 2 will be forced inwardly within the body, these members being forced outwardly by spring 3 when positioned inside of or adjacent to the inner face of plate $b$.

The outer end of body 1 is threaded at $1^a$ to receive a threaded securing ring 7 having on outer annular flange 8 which contacts with the outer face of plate $b$. This ring is provided, in its outer face, with alined grooves $7^a$ for reception of a suitable instrument for turning the ring tightly onto body 1.

Figure 2:
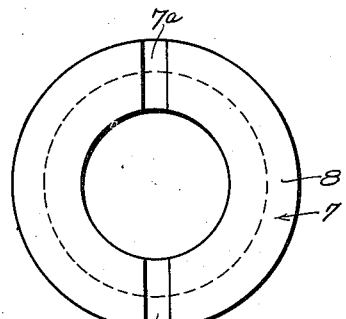
Figure 2 is a top plan view of the securing collar.
Figure 3:
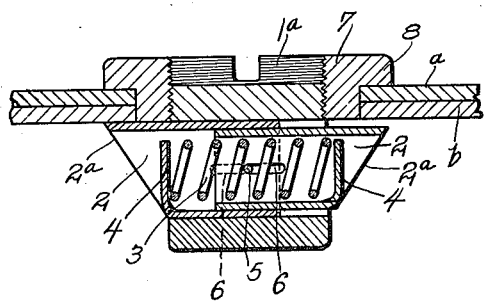
Figure 3 is a sectional view through the device as applied.
Figure 4:
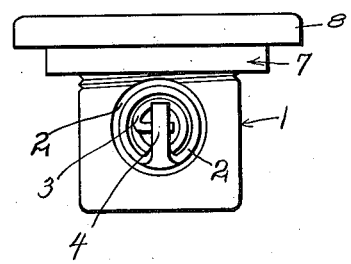
Figure 4 is an end view of the device.

In using the device body 1 is forced through the alined openings of plates $a$ and $b$, members 2 being projected by spring 3 so as to occupy the positions illustrated in Figs. 1 and 2. After this has been done, ring 7 is turned tightly onto the threaded end portion $1^a$ of body 1 so as to force flange 8 into tight engagement with the outer face of plate $a$, members 2 co-acting with this flange to tightly clamp the plates together.

What I claim is:—

1. In a device of the character described, a body threaded at one end for reception of a clamping ring, two telescoping members mounted transversely of the body, means for forcing said members away from each other, and means for limiting outward movement of the telescoping members.

2. In a device of the character described, a body adapted for insertion through alined openings in overlapping plates, telescoping members mounted in said body transversely thereof and having their outer ends inclined downwardly and inwardly toward the body, means for normally holding said members projected so as to extend beyond the body at opposite sides thereof, and means for limiting outward movement of said telescoping members.

3. In a device of the character described, a body adapted for insertion through alined openings in overlapping plates, telescoping members mounted in said body transversely thereof and each provided at its outer end with an upwardly and inwardly directed abutment member, an expansion spring mounted within the telescoping members and confined between said abutment members, said spring acting to normally hold the telescoping members projected, and means for limiting outward movement of said telescoping members.

4. In combination with two overlapping plates provided with alined openings, a body inserted through said openings, telescoping members mounted in said body and projecting beyond the same adjacent to the outer face of one of the plates, means for normally holding said members projected, said means permitting movement of the members inwardly of the body when pressure is exerted on the outer ends of the telescoping members, means for limiting outward movement of the telescoping members, and a securing ring threaded upon said body and provided with an outwardly projecting flange bearing upon the outer face of the other plate.

In testimony whereof I affix my signature.

ETIENNE WITZBERGER.